United States Patent
Hartwig-Biglau et al.

(10) Patent No.: US 11,167,799 B2
(45) Date of Patent: Nov. 9, 2021

(54) IMPACT PROTECTION REINFORCEMENT OF A VEHICLE CONSTRUCTION AS WELL AS CONNECTION AND MANUFACTURING METHODS THEREFOR

(71) Applicants: Böllhoff Verbindungstechnik GmbH, Bielefeld (DE); Constellium Singen GmbH, Singen (DE)

(72) Inventors: Sergej Hartwig-Biglau, Hiddenhausen (DE); Christian Lange, Löhningen (CH)

(73) Assignees: Böllhoff Verbindungstechnik GmbH, Bielefeld (DE); Constellium Singen GmbH, Singen (DE)

( * ) Notice: Subject to any disclaimer, the term of this patent is extended or adjusted under 35 U.S.C. 154(b) by 9 days.

(21) Appl. No.: 16/801,226

(22) Filed: Feb. 26, 2020

(65) Prior Publication Data
US 2020/0277010 A1  Sep. 3, 2020

(30) Foreign Application Priority Data
Feb. 28, 2019 (DE) .......................... 102019105188.6

(51) Int. Cl.
*B60J 9/00* (2006.01)
*B62D 21/15* (2006.01)
(Continued)

(52) U.S. Cl.
CPC .............. *B62D 21/15* (2013.01); *B62D 27/02* (2013.01); *B62D 29/008* (2013.01); *B62D 65/02* (2013.01); *B62D 25/04* (2013.01)

(58) Field of Classification Search
CPC ..... B29C 66/71; B29C 66/7212; B29C 65/48; B60K 1/04; A63B 71/12; B25C 1/06;
(Continued)

(56) References Cited

U.S. PATENT DOCUMENTS 4,252,355 A * 2/1981 Goupy .................... B60R 19/26
293/120
4,386,799 A * 6/1983 Molnar ................... B60R 19/04
293/120
(Continued)

FOREIGN PATENT DOCUMENTS

DE          19849358 A1    5/2000
DE      102012010870 A1    12/2013
(Continued)

OTHER PUBLICATIONS

EP Search Report for EP Application No. 20158727.6 dated Jul. 29, 2020 (9 pages).

*Primary Examiner* — Kiran B Patel
(74) *Attorney, Agent, or Firm* — Reising Ethington P.C.; Matthew J. Schmidt

(57) ABSTRACT

An impact protection reinforcement of a vehicle construction, which is supportively fastenable in the vehicle construction against the action of external mechanical extraordinary load conditions and comprises the following features: an elongated profile element with a longitudinal center line and a transversal center line arranged transversely to the longitudinal center line, which has in the longitudinal direction at each end side a fastening end and a central part therebetween, wherein the central part consists of a circumferentially closed hollow profile with a base layer and a top layer arranged opposite to the base layer, which are connected to each other via lateral faces, and the fastening ends each have a flat shape with at least two fastening points which are spaced apart differently from the transversal center line and the longitudinal center line and are provided as welding connection points to the vehicle construction.

11 Claims, 9 Drawing Sheets

(51) Int. Cl.
 *B62D 27/02* (2006.01)
 *B62D 29/00* (2006.01)
 *B62D 65/02* (2006.01)
 *B62D 25/04* (2006.01)

(58) Field of Classification Search
 CPC ....... B32B 2605/00; B32B 15/08; B32B 7/02; B62D 29/002
 See application file for complete search history.

(56) References Cited

U.S. PATENT DOCUMENTS

| | | | | |
|---|---|---|---|---|
| 5,992,922 A * | 11/1999 | Harbig | ................ | B60J 5/0444 296/146.6 |
| 6,318,775 B1 * | 11/2001 | Heatherington | ........ | B60R 19/18 293/120 |
| 6,328,359 B1 | 12/2001 | Pacella et al. | | |
| 7,025,409 B2 * | 4/2006 | Riley | ................ | B62D 21/152 296/187.03 |
| 7,284,788 B1 * | 10/2007 | Barbat | ................ | B60R 19/34 293/133 |
| 8,020,924 B2 * | 9/2011 | Niezur | ................ | B62D 29/002 296/187.02 |
| 10,336,166 B2 | 7/2019 | Kwak et al. | | |
| 10,384,295 B2 | 8/2019 | Draht et al. | | |
| 10,787,137 B2 * | 9/2020 | Maeda | ................ | B60R 19/04 |
| 2002/0180222 A1 * | 12/2002 | Janssen | ................ | B60R 19/18 293/102 |
| 2003/0155782 A1 * | 8/2003 | Iino | ................ | B60R 19/18 293/142 |
| 2007/0228776 A1 * | 10/2007 | Schiebel | ................ | B62D 25/025 296/187.12 |
| 2008/0189949 A1 * | 8/2008 | Vikstrom | ................ | B21D 5/086 29/897.2 |
| 2008/0284183 A1 * | 11/2008 | Johnson | ................ | B60R 19/18 293/102 |
| 2009/0079210 A1 * | 3/2009 | Matsumura | ................ | B60R 19/24 293/155 |
| 2009/0152896 A1 * | 6/2009 | Enderich | ................ | B62D 29/001 296/187.03 |
| 2010/0013249 A1 * | 1/2010 | Karlander | ................ | B60R 19/18 293/132 |
| 2010/0117397 A1 * | 5/2010 | Richardson | ......... | B29C 65/4855 296/187.02 |
| 2010/0253102 A1 * | 10/2010 | Riviere | ................ | B62D 21/152 293/121 |
| 2012/0025545 A1 * | 2/2012 | Haneda | ................ | B60R 19/18 293/102 |
| 2013/0270229 A1 | 10/2013 | Pedersen et al. | | |
| 2015/0144602 A1 | 5/2015 | Draht et al. | | |
| 2015/0307045 A1 * | 10/2015 | Matecki | ................ | B60R 19/18 293/122 |
| 2016/0221519 A1 * | 8/2016 | Basela | ................ | B32B 7/12 |
| 2016/0280163 A1 * | 9/2016 | Matecki | ................ | E04C 3/06 |
| 2016/0297387 A1 * | 10/2016 | Prasoody | ................ | B60R 19/24 |
| 2017/0028951 A1 * | 2/2017 | Shin | ................ | B60R 19/18 |
| 2017/0036624 A1 * | 2/2017 | Yabu | ................ | B60R 19/03 |
| 2017/0129431 A1 * | 5/2017 | Rabe | ................ | B60R 19/20 |
| 2017/0210318 A1 * | 7/2017 | Lange | ................ | B62D 21/152 |
| 2018/0015895 A1 * | 1/2018 | Kaneko | ................ | B60R 19/04 |
| 2018/0037179 A1 * | 2/2018 | Steinebach | ................ | B23K 31/02 |
| 2018/0086183 A1 * | 3/2018 | Figoli | ................ | B60J 5/0443 |
| 2018/0141512 A1 * | 5/2018 | Munjurulimana | ...... | B60R 19/18 |
| 2018/0178743 A1 * | 6/2018 | Kurihara | ................ | B60R 19/56 |
| 2018/0215331 A1 * | 8/2018 | Gumpina | ................ | B60R 19/18 |
| 2018/0236851 A1 | 8/2018 | Shimoaka et al. | | |
| 2018/0265025 A1 * | 9/2018 | Ki | ................ | B62D 21/02 |
| 2019/0009837 A1 * | 1/2019 | Takii | ................ | B62D 21/12 |
| 2019/0168700 A1 * | 6/2019 | Lattorff | ................ | B60R 19/04 |
| 2019/0168702 A1 * | 6/2019 | Fujii | ................ | B60R 19/24 |
| 2019/0193656 A1 * | 6/2019 | Yabu | ................ | B60R 19/03 |
| 2019/0233014 A1 * | 8/2019 | Tagaito | ................ | B60R 19/24 |
| 2019/0321908 A1 | 10/2019 | Draht et al. | | |
| 2020/0122663 A1 * | 4/2020 | Nilsson | ................ | B60R 19/18 |
| 2020/0263752 A1 * | 8/2020 | Miura | ................ | F16F 7/12 |
| 2020/0307479 A1 * | 10/2020 | Hasegawa | ................ | B60R 19/24 |
| 2020/0346600 A1 * | 11/2020 | Lee | ................ | B60R 19/24 |
| 2020/0384934 A1 * | 12/2020 | Yotsuyanagi | ........... | B60R 19/34 |
| 2021/0024022 A1 * | 1/2021 | Matecki | ................ | B60R 19/12 |
| 2021/0046889 A1 * | 2/2021 | Yokota | ................ | B60R 19/34 |
| 2021/0178868 A1 * | 6/2021 | Williams | ................ | B60J 5/0425 |

FOREIGN PATENT DOCUMENTS

| | | |
|---|---|---|
| DE | 102012018866 A1 | 3/2014 |
| DE | 102013015421 A1 | 4/2014 |
| DE | 102014018421 A1 | 1/2016 |
| DE | 102017123645 A1 | 6/2018 |
| DE | 102017115229 A1 | 1/2019 |
| EP | 1194317 A1 | 4/2002 |
| JP | 2013022622 A | 2/2013 |
| WO | WO2012041515 A1 | 4/2012 |

* cited by examiner

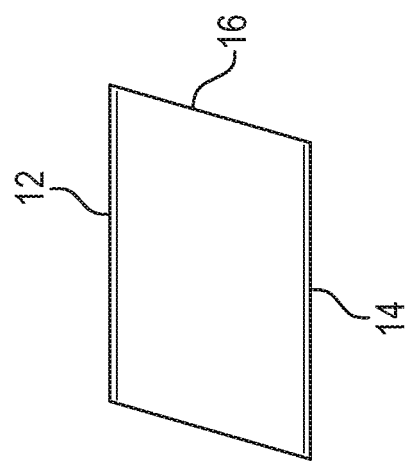
FIG. 3a
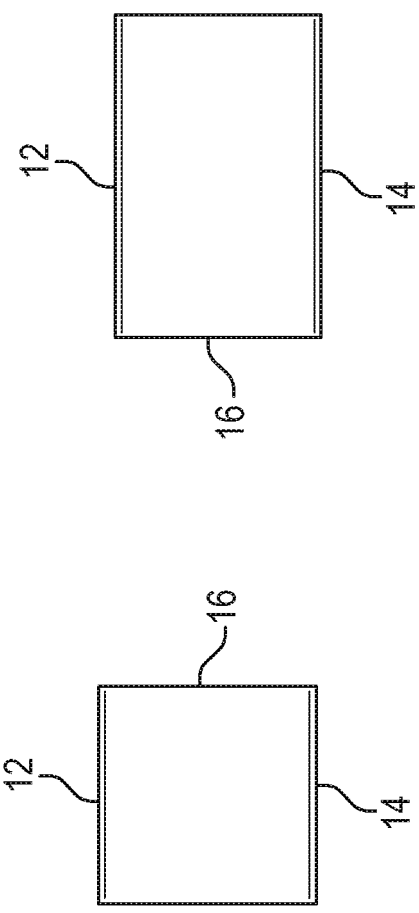
FIG. 3b
FIG. 3c
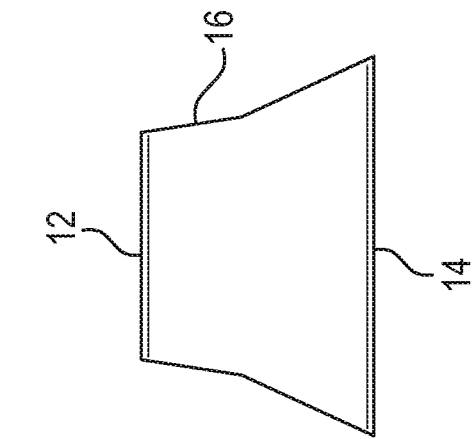
FIG. 3d
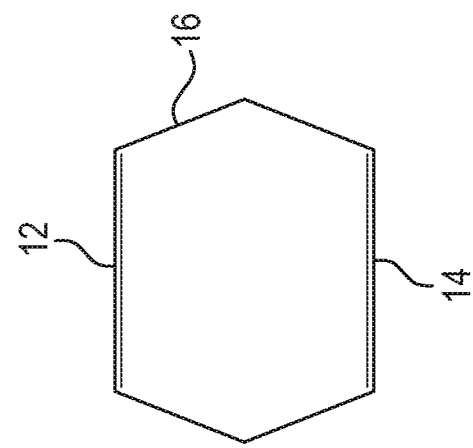
FIG. 3e
FIG. 3f

IMPACT PROTECTION REINFORCEMENT OF A VEHICLE CONSTRUCTION AS WELL AS CONNECTION AND MANUFACTURING METHODS THEREFOR

CROSS REFERENCE TO RELATED APPLICATIONS

This application claims the priority of German patent application No. 102019105188.6, filed on Feb. 28, 2019. The entire content of this priority application is incorporated herein by reference in its entirety.

TECHNICAL FIELD

The present disclosure is related to an impact protection reinforcement of a vehicle construction, which is supportively fastenable in the vehicle construction against the influence of external mechanical extraordinary load conditions, such as an accident in road traffic. Furthermore, the present disclosure comprises a vehicle construction with at least one impact protection reinforcement. The subject matter of the present application is furthermore a connection method for such an impact protection reinforcement to a vehicle construction as well as a manufacturing method for the impact protection reinforcement, which is made of aluminum or an aluminum alloy.

BACKGROUND

In the prior art, various beam constructions are known, which are used as reinforcement elements in frame constructions, such as vehicle frames. Such reinforcement beams are distinguished by a profile shape in order to be able to resist expected bending loads more strongly. Among others, T-beams or double T-beams are used for reinforcement.

A further alternative is to fasten a hollow profile in a frame construction.

The reinforcement beams are fastened in different ways to reinforce the frame construction. In addition to classic screw or rivet connections, it is also common to have the reinforcement construction welded to the existing frame construction. However, for this it must be ensured that there is sufficient access to the welding locations or also joining locations.

JP 2013-22622 describes a profile beam which is formed by a hollow profile. This hollow profile consists of a base layer and a top layer, which are connected to each other via side or lateral faces. In cross-section, the profile beam shows a rectangular profile, with the base layer and the top layer having a greater thickness than the connecting lateral faces. The profile beam is fastened to a frame construction by means of auxiliary joining elements. For this, these auxiliary joining elements only penetrate the base layer in order to then create a connection with the adjacent frame construction. To allow access to the joining locations, the top layer above the base layer with the joining elements was removed. According to another alternative, openings are arranged in the top layer in order to gain access to the joining elements in the base layer through these openings. Since the joining elements and thus the connection locations are arranged in the longitudinal direction of the profile beam, initially only one connecting joining element adopts a bending of the profile beam perpendicular to the longitudinal direction of the profile beam and transfers the mechanical load into the frame construction. Here it is a disadvantage that the mechanical load during a bending of the profile beam is not distributed over several joining elements and thus several joining locations. This is because only individual joining locations are mechanically loaded one after the other.

In DE 10 2017 123 645 A1, a door impact beam of a different type is described. This door impact beam is arranged within a door frame of a vehicle. In order to achieve the necessary stability of the door impact beam, the latter has a tube shape. The tube is inserted into separate end-side holders and is then fastened to the vehicle frame or door frame. According to another alternative, punches are plugged onto the tube ends, which are then widened out flat to fastening ends in further processing steps. Here, the tube is also formed into a U-profile in order to achieve the desired mechanical stability for the door impact beam. The deformation of the tube and the tube ends is achieved by hot pressing. This deformation process has the disadvantage that internal material damage can weaken the produced U-profile. In addition, a U-profile is only suitable for specific load conditions that differ from those of a hollow profile.

Another disadvantage of this door impact beam is the arrangement of its joining locations, which connect it to the frame construction, here the door frame. This is because these joining locations are arranged next to each other transversely to the longitudinal axis of the door impact beam. This certainly means that the mechanical bending load is distributed to the adjacent joining locations. Thus the individual joining locations are subjected to reduced loads. However, if the joining locations fail at the same height or at the same distance from the bending location of the door impact beam, there is no further joining location present which is able to absorb a mechanical load at a greater distance from the central bending center. Therefore, a loosening of the used joining locations arranged next to each other would release the door impact beam from the frame construction.

Different additional reinforcements are also described in WO 2012/041 515 A1. On one hand, there is a door reinforcement beam, which is designed as a U-shaped profile in its cross-section. This door reinforcement beam is fastened to the door frame via flattened end portions. Here, as already described above, the fastening points in the end portions are located at the same distance from a possible bending load in the reinforcing beam element. Thus, in case of a possible bending load of the beam, the mechanical load is distributed among the joining locations arranged at the end sides. If, however, the joining locations arranged at the same distance fail, the reinforcement beam is released from the frame construction.

Furthermore, WO 2012/041 515 A1 describes an additional reinforcement profile for a B-pillar. This additional reinforcement profile is designed in the shape of a U-profile. It can therefore be inserted into the likewise U-shaped B-pillar and fastened by means of several joining locations. This additional reinforcement profile is thus realized as an identical B-pillar with reduced length, resulting in a multi-layer designed B-pillar construction. Compared to the door impact beams, both the construction of the additional reinforcement profile and the fastening of the additional reinforcement profile in the B-pillar are different. This is because the additional reinforcement profile is fastened to the B-pillar via a plurality of joining locations evenly distributed over the entire length of the additional reinforcement profile. In this way, bending loads on the B-pillar from different length ranges of the B-pillar can be received and supported by the additional reinforcement profile. The fastening principle used is hence not to provide the fastening to the B-pillar in the end portions arranged relative to the longitudinal direction of the additional reinforcement profile. Instead, the fastening points between the B-pillar and the additional reinforcement profile are distributed over the entire length of the additional reinforcement profile.

With reference to the prior art discussed above, an object of at least some implementations of the present disclosure is to provide an alternative reinforcement construction for supporting a vehicle structure which effectively absorbs mechanical extraordinary load conditions and is at the same time reliably fastened in the vehicle structure.

SUMMARY

The above object is solved by an impact protection reinforcement of a vehicle construction, a vehicle construction with at least one of the above-mentioned impact protection reinforcements, a connection method for an impact protection reinforcement with a vehicle construction as well as a manufacturing method for the above-mentioned impact protection reinforcement. Further embodiments and designs are set forth in the following description, the accompanying drawings and the appending claims.

The impact protection reinforcement of a vehicle construction which can be supportively fastened in the vehicle construction against the influence of external mechanical extraordinary load conditions comprises the following features: an elongated profile element with a longitudinal center line and a transversal center line arranged transversely to the longitudinal center line, which has in the longitudinal direction at each end side a fastening end and a central part therebetween, wherein the central part consists of a circumferentially closed hollow profile with a base layer and a top layer arranged opposite to the base layer, which are connected to each other via lateral faces, and the fastening ends each have a flat shape with at least two fastening points which are spaced apart differently from the transversal center line and the longitudinal center line and which are provided as connection points to the vehicle construction.

The impact protection reinforcement serves for the additional reinforcement of a vehicle construction, such as a door frame, a front or rear area of a vehicle frame and other positions that could be confronted with extraordinary load conditions. In this context, a mechanical extraordinary load condition is defined as the mechanical impact of an object on the vehicle construction in the area where the impact protection reinforcement is located. An object is, for example, another vehicle which collides with the vehicle structure in the context of a traffic accident. In addition, an object is also a massive roadway barrier, a tree or another obstacle that strikes the vehicle construction due to an unforeseeable path of movement of the vehicle. This is the case, among others, if under disadvantageous roadway conditions a vehicle begins to skid and collides uncontrollably with a tree or a roadway barrier.

The impact protection reinforcement achieves its mechanical stability through the use of an elongated profile element as the central part of the impact protection reinforcement. This profile element is limited by fastening ends at which the impact protection reinforcement may be connected to the vehicle construction. In order to achieve an application range of the impact protection reinforcement as wide as possible, a closed hollow profile is used in the central part of the elongated profile element. Due to the circumferentially closed hollow profile, various load conditions may be receivable by the profile element, while the closed hollow profile stabilizes itself. In this context, the circumferentially closed hollow profile in particular is more stable and therefore more advantageous than, for example, a simple T-profile or a U-shaped profile.

The fastening ends are designed flat or two-dimensionally so that a plurality of fastening points is arrangeable in these fastening ends, which later form connection points to the vehicle construction. For this purpose, depending on the type of connection, the impact protection reinforcement is first provided with welding auxiliary joining parts by means of a joining process in accordance with an alternative, so that it can subsequently be welded to the vehicle construction, for example. If the impact protection reinforcement may be connected to the vehicle construction by means of nails, punch rivets, flow-forming screws or clinching processes, no holes or similar are provided at the fastening points. Instead, the joining elements such as nails, punch rivets, flow-forming screws may be joined directly into the fastening points during the connection process to the vehicle construction (see below). The same applies for a connecting clinching process, which does not require any preparation. For a screw connection at the fastening points, holes may be also provided, via which the connection may be established.

As an example of the different types of connection means, which may be used in the present disclosure, reference is made to welding auxiliary joining parts. Accordingly, instead of the described welding auxiliary joining parts, a different connection means and a connection method related thereto is also applicable.

The welding auxiliary joining parts form the basis for welding different materials of impact protection reinforcement and vehicle construction to each other. Thereby, the welding auxiliary joining parts are made of a material which is weldable to the vehicle construction.

The flat or planar shape of the fastening ends ensures that the plurality of welding auxiliary joining parts or alternative connection means or joining elements can be arranged with respect to the transversal center line and the longitudinal center line of the impact protection reinforcement in such a manner that possible load conditions are removed or carried off and the individual welding of the welding auxiliary joining parts has as little effect as possible on adjacent joining locations.

Due to the different spacing of at least two fastening points to the transversal center line and to the longitudinal center line, it is ensured that during a load condition of the impact protection reinforcement, the used welding auxiliary joining parts or alternative connection means or joining elements support each other mechanically. In addition, the arrangement ensures that in the event of failure of a first connection location, the at least second connection location is still present and intact in order to retain the impact protection reinforcement in the vehicle construction. This would not be the case, for example, if the at least two fastening points were at the same distance from the transversal center line of the impact protection reinforcement. In this case, a load condition could result in the fact that if a sufficiently high mechanical load is applied to both connection locations with the same amount of force, these connection locations would fail and thus the impact protection reinforcement would be detached from the vehicle construction.

According to a further embodiment, the base layer and the top layer of the hollow profile of the central part comprise a greater thickness than the connecting lateral faces.

It was found that within the hollow profile, it is in particular the mechanical loads which are removed or carried off by the top layer and the base layer. This is because these layers are bent by the mechanical load of the extraordinary load conditions and must resist this bending sufficiently. The closed side walls or lateral walls, which connect the base layer with the top layer, provide additional stability to the hollow profile due to their arrangement, which for example is perpendicular or inclined to the base layer and the top layer. Thus the stability of the hollow profile is increased on the one hand by the thickness of the base layer and top layer and on the other hand by the arrangement of the lateral faces between the base layer and the top layer.

According to a further embodiment, the at least one fastening end of the impact protection reinforcement consists of a compressed hollow profile, so that the base layer and the top layer are arranged adjacent to each other in a flat or planar manner and the lateral faces are widened laterally outwardly with respect to the longitudinal center line of the impact protection reinforcement.

Due to the above-described construction of the at least one fastening end, the base layer and the top layer may abut each other. The fastening to the vehicle construction may be then achieved by means of the welding auxiliary joining parts through the combined base layer and top layer to the vehicle construction. Due to the stack-like arrangement of the base layer and the top layer in the at least one fastening end, the fastening end is firstly designed more stable than a base layer or top layer alone. Furthermore, the compression of the fastening end results in that the hollow profile is laterally widened in the portion of the fastening end. This provides a larger area for fastening the fastening end to the vehicle construction. This may open up the possibility to adjust the arrangement of the plurality of welding auxiliary joining parts or alternative connection means or joining elements to a possible case of load, so that this arrangement of the plurality of welding auxiliary joining parts reliably fastens the impact protection reinforcement in the vehicle construction and holds or lasts also in case of load.

According to another embodiment, at least one fastening end is wedge-shaped in a side view in the direction of the transversal center line and the base layer or the top layer is cut out, so that the fastening points and the welding auxiliary joining parts may be arranged in the uncut top layer or base layer.

In contrast to the above-described embodiment, according to the further design, the fastening of the impact protection reinforcement may be achieved only by the base layer or the top layer. This is because for this purpose the respective other layer was cut away so that a sufficient access to the remaining base layer or top layer is provided for joining the welding auxiliary joining parts and subsequent welding or for connecting the alternative connection means or joining elements. While this construction of the at least one fastening end does not have the same thickness as a combination of the base layer and top layer, certain spatial restrictions of the vehicle construction as well as fastening possibilities of the vehicle construction can be taken into account due to this construction. This is because, in a similar manner to the alternative of the fastening end described above, a removal of the top layer or the fastening layer also provides a sufficient area or space for the joining of the welding auxiliary joining parts. The easier access due to the removal of the top layer or the base layer may ensure that the preferred resistance welding or an alternative connection method can also be realized in combination with the hollow profile that may be used as the central part.

According to a further embodiment, only two fastening points for one connection means each are provided at at least one fastening end, which are spaced apart from each other in the transverse direction and in the longitudinal direction of the impact protection reinforcement.

In order to keep the effort of fastening the impact protection reinforcement as low as possible and also not to additionally increase the vehicle weight by the arrangement of the impact protection reinforcement, according to a further embodiment, only two connection means, which may include two welding auxiliary joining parts, may be arranged in one or both fastening ends. For the distribution of the possibly occurring mechanical load conditions, the two connection means, welding auxiliary joining parts or alternative joining elements or fastening methods, may be positioned specifically not next to each other parallel to the transversal center line or the longitudinal center line of the impact protection reinforcement. Rather, it may be preferred that an imaginary connection line between the two set welding auxiliary joining parts or the planned fastening points is arranged at an angle not equal to 0° and not equal to 90° to the longitudinal center line and the transversal center line of the impact protection reinforcement. This allows for the possibility that mechanical loads are distributed to both connection locations and that these do not fail at the same time. Furthermore, this arrangement allows for the possibility that the two connection points are spaced apart from each other to such an extent that they avoid or at least reduce a bypass or shunt current flow via the other connection location at resistance welding.

According to a further embodiment, only three fastening points for one connection means each are provided at at least one fastening end, at least two of which are differently spaced from the transversal center line and all are differently spaced from the longitudinal center line.

According to this further embodiment, the use of three connection means, welding auxiliary joining parts, or three fastening points on at least one fastening end may be preferred. This is because the use of three welding auxiliary joining parts also ensures that the possibly occurring mechanical loads are distributed in such a manner that the three connection locations support each other and do not fail at the same time in case of load. For this purpose, the three welding auxiliary joining parts are not arranged in a line, such as parallel to the transversal center line or parallel to the longitudinal center line of the impact protection reinforcement. The arrangement of the three welding auxiliary joining parts in the at least one fastening end may form an equal-sided triangle. In the same way, it may also be preferred that an isosceles triangle is chosen for this arrangement. Even if two of the welding auxiliary joining parts are arranged next to each other and parallel to the transversal center line, it is precisely the further welding auxiliary joining part arranged at a distance thereto which ensures an advantageous distribution of the mechanical load of the connection between impact protection reinforcement and vehicle construction.

According to a further design, the arrangement of the three welding auxiliary joining parts or the three planned connection points or the three planned connection means forms a triangle, whereby, however, none of the sides of the triangle is arranged parallel to the transversal center line and the longitudinal center line of the impact protection reinforcement.

According to another embodiment, only one side of the triangle is arranged parallel to the transversal center line or the longitudinal center line of the impact protection reinforcement.

According to a further embodiment, only four fastening points for one connection means each are provided at at least one fastening end, at least two of which are spaced differently from the transversal center line and at least two of which are spaced differently from the longitudinal center line of the impact protection reinforcement.

The four welding auxiliary joining parts or alternative connection means (see above) arranged in this embodiment or the planned four fastening points in at least one fastening end form a quadrangle or a four-sided figure when viewed together. This quadrangle may have the shape of a square, a parallelogram, a rectangle or a trapezoid. According to a further embodiment of this arrangement, none of the lateral faces of the quadrangular arrangement of the welding auxiliary joining parts or of the planned fastening points extends parallel to the transversal center line and the longitudinal center line of the impact protection reinforcement. It, however, may also be preferred that at least two of the opposite sides of the quadrangle are arranged parallel to the transversal center line or the longitudinal center line. This arrangement of the welding auxiliary joining parts or the arrangement of the corresponding fastening points also ensures a reliable fastening of the impact protection reinforcement in the vehicle construction.

It may be further preferred that the fastening ends of the impact protection reinforcement comprise a plurality of welding auxiliary joining parts which are joined therein and are weldable to a vehicle construction made of steel. This construction has the advantage that the impact protection reinforcement can, for example, be made of a non- or poorly weldable material. Such materials include aluminum, aluminum alloys, plastic, fiber-reinforced plastic, sandwich components or any other material combination that is poorly or non-weldable with metals. Since a vehicle construction is often made of steel or other metals, the fastening ends of the impact protection reinforcement are provided with a plurality of welding auxiliary joining parts made of steel. Once these have been set into the fastening ends in an arrangement, the impact protection reinforcement, in particular the fastening ends, may be connected to the vehicle construction by means of a resistance welding method.

According to another embodiment, the fastening ends of the impact protection reinforcement each have a bore at the fastening points by which the impact protection reinforcement is screwable to a vehicle construction. For this purpose, known screw connections are used, such as a threaded bolt with nut or similar.

According to another embodiment, the impact protection reinforcement may be provided in the form of an extruded or continuously cast aluminum profile, which is made of aluminum or an aluminum alloy. In this context, the use of aluminum and/or aluminum alloys has the advantage of being mechanically stable and having low weight at the same time. The higher requirements for manufacturing a weld connection, for example with a steel construction, are solved by using the welding auxiliary joining parts already discussed above and the subsequent resistance welding.

According to another embodiment, the impact protection reinforcement may be provided as a roll-formed or deep-drawn metal part, made of steel or a metal alloy, or as a metal cast part.

The present disclosure further comprises a vehicle construction with at least one impact protection reinforcement according to the embodiments described above, which is welded to the vehicle construction by means of the fastening ends.

According to a further embodiment of said vehicle construction, a plurality of welding auxiliary joining parts are set into the fastening ends of the impact protection reinforcement, which are welded to the vehicle construction by means of a resistance welding method and provide a firm connection between the vehicle construction and the impact protection reinforcement.

According to another design of the vehicle construction with impact protection reinforcement, the fastening ends of the impact protection reinforcement are screwed to the vehicle construction via the plurality of bores provided therein to provide a firm connection between the vehicle construction and the impact protection reinforcement.

Alternatively to this, and according to a further design of the vehicle construction with impact protection reinforcement, the fastening ends of the impact protection reinforcement are connected to the vehicle construction via the plurality of fastening points provided therein each with a punch rivet, a bolt or nail, a flow-forming screw or a clinch connection, which provide a firm connection between the vehicle construction and the impact protection reinforcement.

The present disclosure includes a connection method for an impact protection reinforcement made of extruded or continuously cast aluminum, an aluminum alloy, cast metal, or roll-formed or deep-drawn metal according to one of the above-described embodiments to a vehicle construction. This connection method comprises the following steps: setting a plurality of welding auxiliary joining parts each into the fastening ends of the impact protection reinforcement, arranging the impact protection reinforcement in the vehicle construction and connecting the fastening ends of the impact protection reinforcement at the fastening points with corresponding connection means to the vehicle construction.

In the context of the connection method, in combination with the welding auxiliary joining parts which may be preferred as connection means, as a further step a setting of a plurality of welding auxiliary joining parts each into the fastening ends of the impact protection reinforcement and a resistance welding of the welding auxiliary joining parts to the vehicle body takes place. According to an alternative design of the connection method, the fastening ends of the impact protection reinforcement each have a bore at the fastening points. From this constructional basis, in a further step a screwing together of the impact protection reinforcement and the vehicle construction takes place. According to another alternative method alternative, a plurality of punch rivets are set each into the fastening ends at the fastening points of the impact protection reinforcement and into the vehicle construction. As a further method alternative, flow-forming screws may be used as connection means. Accordingly, a setting of a plurality of flow-forming screws into the fastening ends at the fastening points of the impact protection reinforcement and into the vehicle construction is alternatively carried out. According to another, further alternative of the connection method, the impact protection reinforcement and the vehicle construction are connected to each other by means of a clinch connection each at the fastening points of the fastening ends. Based on the connection alternatives summarized above, it becomes clear that different connection means and connection methods can be used to utilize the advantages of the impact protection reinforcement in combination with a construction to be reinforced, such as a vehicle construction.

In addition, the present disclosure comprises a manufacturing method for an impact protection reinforcement according to one of the above-described embodiments made of aluminum or an aluminum alloy. This manufacturing method comprises the following steps: extruding or continuously casting an elongated profile element as a hollow profile having a base layer and a top layer which are connected to each other by lateral faces, compressing at least one end of the profile element so that the base layer and the top layer are arranged adjacent to each other and the lateral faces are widened laterally outwardly with respect to the longitudinal center line of the impact protection reinforcement, and/or cutting out the base layer or the top layer in the portion or area of the fastening end, so that at least one fastening end is formed wedge-shaped in a side view in the direction of the transversal center line and the fastening points are arranged in the uncut top layer or base layer, and setting a plurality of welding auxiliary joining parts into each fastening end to prepare a welding of the impact protection reinforcement to a vehicle construction by means of resistance welding.

In addition, the present disclosure comprises an alternative manufacturing method for one of the above-described impact protection reinforcements made of metal or a metal alloy, which does not comprise aluminum. Among these is, for example, steel. This manufacturing method comprises the following steps: roll forming, deep drawing or casting an elongated profile element as a hollow profile having a base layer and a top layer which are connected to each other via lateral faces, and compressing at least one end of the profile element so that the base layer and the top layer are arranged adjacent to each other and the lateral faces are widened laterally outwardly with respect to the longitudinal center line of the impact protection reinforcement, and/or cutting out the base layer or the top layer in the portion or area of the fastening end so that at least one fastening end is formed wedge-shaped in a side view in the direction of the transversal center line and the fastening points are arranged in the uncut top layer or base layer. In the context of this manufacturing method, there may be the further step: creating a plurality of holes in each fastening end to prepare a screwing together of the impact protection reinforcement to a vehicle construction.

BRIEF DESCRIPTION OF THE DRAWINGS

The embodiments of the present disclosure are explained in more detail with reference to the accompanying drawing. Showing:

FIGS. 3a-3f cross-sectional shapes of the hollow profile-like central part of the impact protection reinforcement, FIG. 4 an enlarged view of a fastening end of an embodiment according to FIG. 1, FIG. 5 an enlarged view of an embodiment of a fastening end of the impact protection reinforcement, FIG. 6 an enlarged view of a further embodiment of a fastening end of the impact protection reinforcement, FIG. 7 an enlarged view of a further embodiment of a fastening end of the impact protection reinforcement, FIG. 8 an enlarged view of a further embodiment of a fastening end of the impact protection reinforcement, FIG. 9 a flow chart of an embodiment of a connection method of the impact protection reinforcement to a vehicle construction, and FIG. 10 a flow chart of an embodiment of a manufacturing method of the impact protection reinforcement.

DETAILED DESCRIPTION

Figure 1:
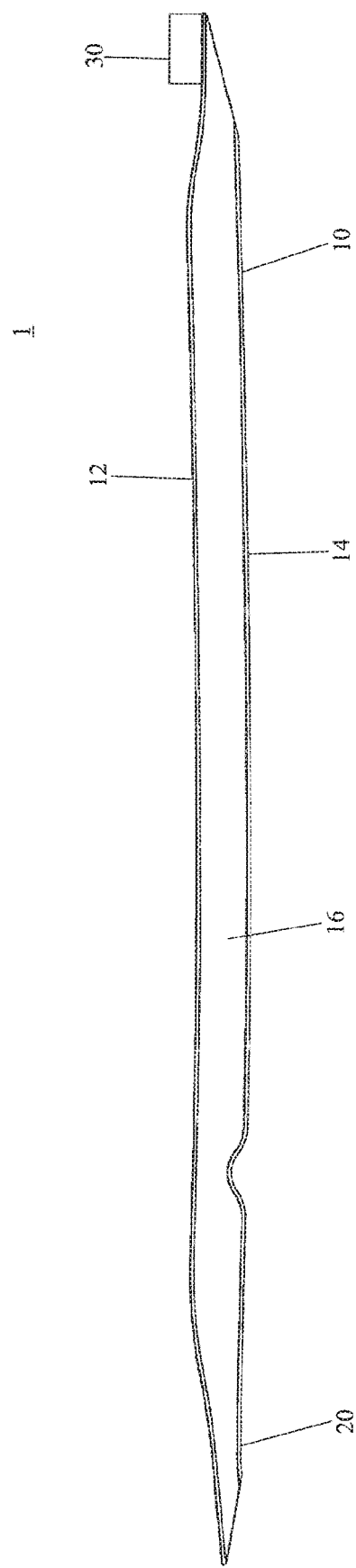
FIG. 1 a side view of an embodiment of an impact protection reinforcement.
Figure 2:
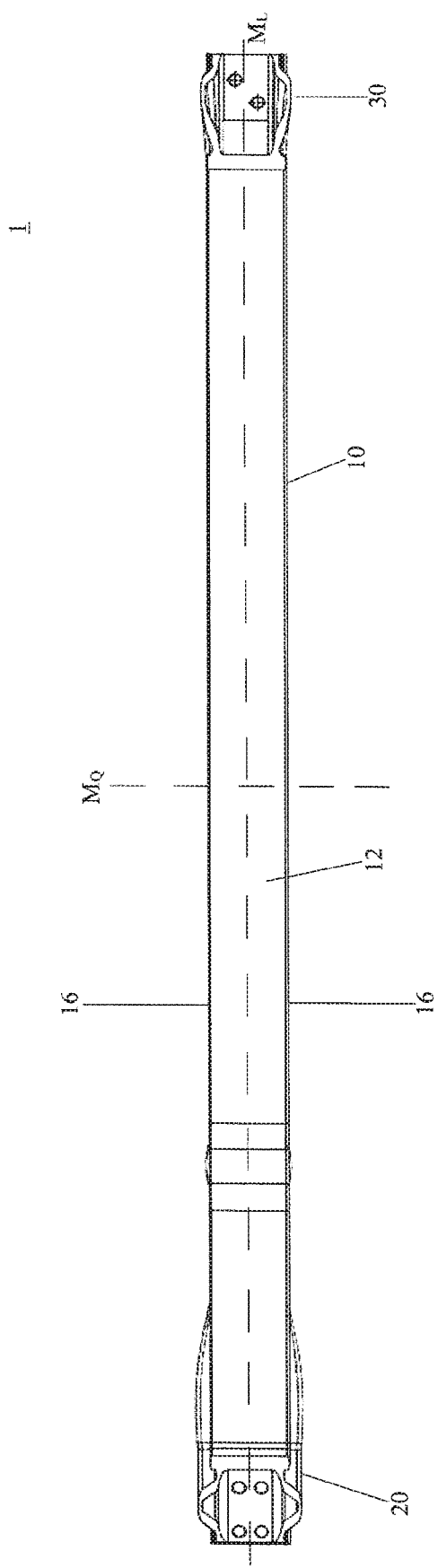
FIG. 2 a top view of the embodiment according to FIG. 1.

The impact protection reinforcement 1 is shown in a side view in FIG. 1 and in a top view in FIG. 2 according to an embodiment of the present disclosure. The impact protection reinforcement 1 is formed by an elongated profile element. This consists of a hollow profile in a central part 10.

The elongated profile element may be made of aluminum or an aluminum alloy. This choice of material may be preferred due to its own weight and its strength and deformation properties compared to steels and other metals or plastics. According to other embodiments, the impact protection reinforcement 1 may also be made of steel, plastic or a reinforced plastic, depending on the application.

For the manufacturing of the impact protection reinforcement 1 of aluminum or an aluminum alloy, the elongated profile element 10 may be extruded or continuously cast (step H 1). In order to set a suitable length for the impact protection reinforcement 1, the extruded or continuously cast hollow profile 10 is cut to the appropriate length. After this, the processing continues.

If the impact protection reinforcement is made of steel or another metal that does not include aluminum, or of another metal alloy without aluminum, roll forming, deep drawing or casting of an elongated profile element as hollow profile is used.

In the following, the construction of the impact protection reinforcement 1 is described using the example of the impact protection reinforcement 1 made of aluminum or an aluminum alloy. This is exemplary for an impact protection reinforcement 1, which can be formed from one of the above-mentioned or another suitable material.

The elongated hollow profile of the central part 10 comprises a base layer 12 and a top layer 14. The base layer 12 and top layer 14 may be arranged parallel to each other and are connected to each other via lateral faces 16. It may also be preferred that the base layer 12 and the top layer 14 are arranged converging to each other and are connected to each other via the lateral faces 16.

The combination of the base layer 12 and the top layer 14 as well as the lateral faces 16 may form a circumferentially closed hollow profile.

It may be preferred that the impact protection reinforcement 1 comprises a fastening end 20; 30 at each end of the elongated profile construction. By means of the two fastening ends 20; 30, the impact protection reinforcement 1 is connected to a vehicle construction or another frame construction and the latter are thereby reinforced.

The base layer 12 and the top layer 14 can be described by a longitudinal center line $M_L$ and a transversal center line $M_Q$. The longitudinal center line $M_L$ extends in the longitudinal direction of the base layer 12 or the top layer 14 in the middle thereof (see FIG. 1). The transversal center line $M_Q$ divides the impact protection reinforcement 1 transversely to the longitudinal direction into two halves (see FIG. 1). For further description of the construction of the impact protection reinforcement 1, the longitudinal center line $M_L$ and the transversal center line $M_Q$ may extend in the plane of the base layer 12, as shown in FIG. 2.

In order to achieve the stability of the impact protection reinforcement 1, the base layer 12 and the top layer 14 may have a greater material thickness than the connecting lateral faces 16. Depending on the application, it may also be preferred to provide the base layer 12, the top layer 14 and the lateral faces 16 with the same material thickness. To achieve weight savings, however, it is advantageous to use lateral faces 16 of lower material thickness compared to the base layer 12 and the top layer 14.

According to a first embodiment of the closed hollow profile of the central part 10, the cross-section may have the shape of a square. Further preferred are also cross-sectional shapes in the form of a rectangle or parallelogram or trapezoid or polygon. Correspondingly usable cross-sections of the hollow profile-like central part 10 are shown in FIG. 3.

By means of the different cross-sections of the hollow profile-like central part 10, the impact protection reinforcement 1 is adapted to possible mechanical extraordinary load conditions and the reinforcements that are necessary for this. Mechanical extraordinary load conditions refer to mechanical loads on a frame construction, such as a vehicle construction, which do not occur permanently or cyclically, but only in exceptional situations. With regard to a motor vehicle, a mechanical extraordinary load condition is a traffic accident, a collision with an obstacle due to unfavorable roadway conditions or similar. By an extraordinary load condition the frame construction is subjected to a mechanical load for which it does not have to be designed as standard. In order to still be able to resist this extraordinary load condition sufficiently, the frame construction is reinforced with the impact protection reinforcement 1 in areas where extraordinary load conditions may occur.

FIG. 3, for example, shows the following shapes as non-exhaustive example designs of the cross-section of the hollow profile-like central part 10: A) a square, B) a rectangle, C) a parallelogram, D) a trapezoid as well as E) and F) a polygon. It may also be preferred to use an octagonal polygon as cross-section.

If it may be assumed that a mechanical extraordinary load condition acts in the normal direction of the base layer 12 or the top layer 14, the impact protection reinforcement 1 is loaded or stressed by bending along the longitudinal center line $M_L$. This bending stress may be counteracted by the different shape designs of the lateral faces 16.

According to a further embodiment, the hollow profile of the central part 10 is formed closed at its circumference except for the fastening ends 20; 30. According to another embodiment of the hollow profile-like central part 10, the base layer 12 and the top layer 14 extend parallel to each other over at least 70% of their length.

Figure 4:
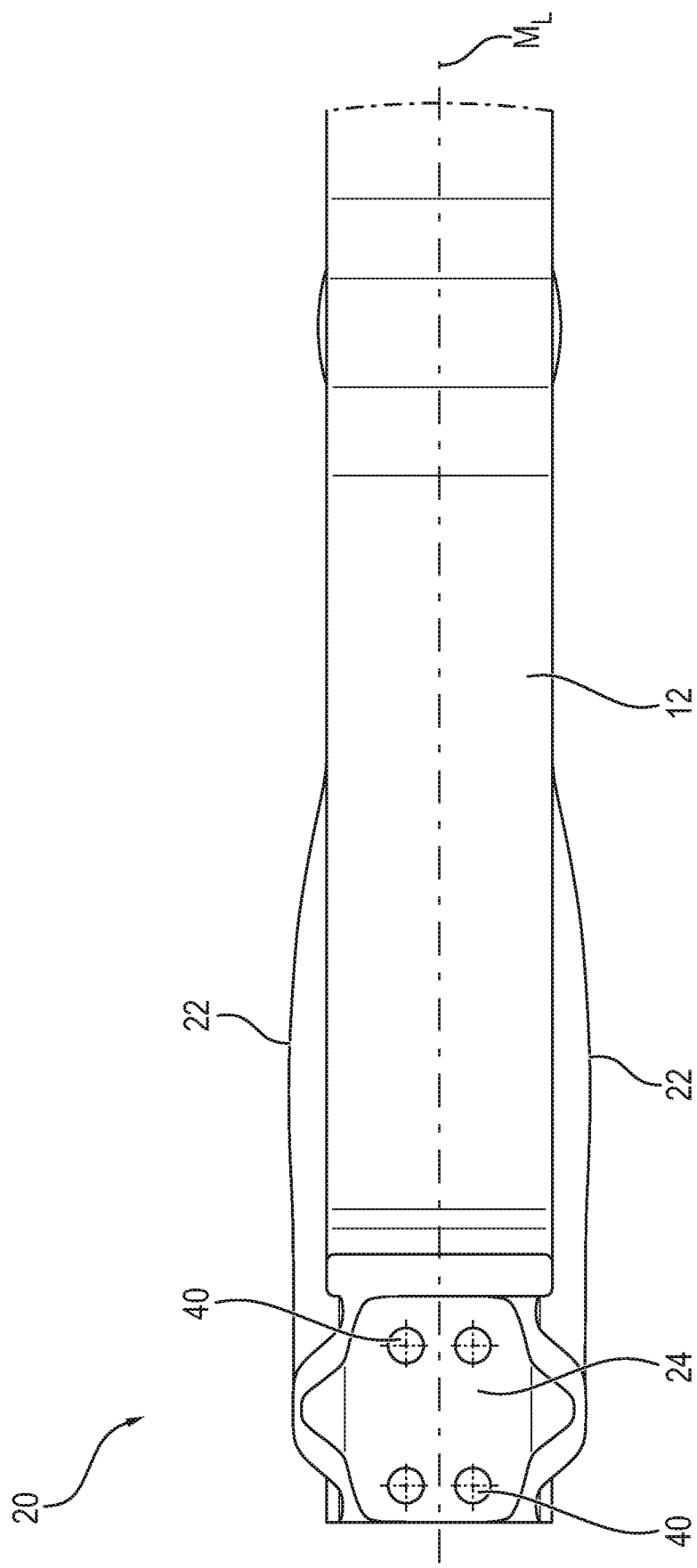
Figure 5:
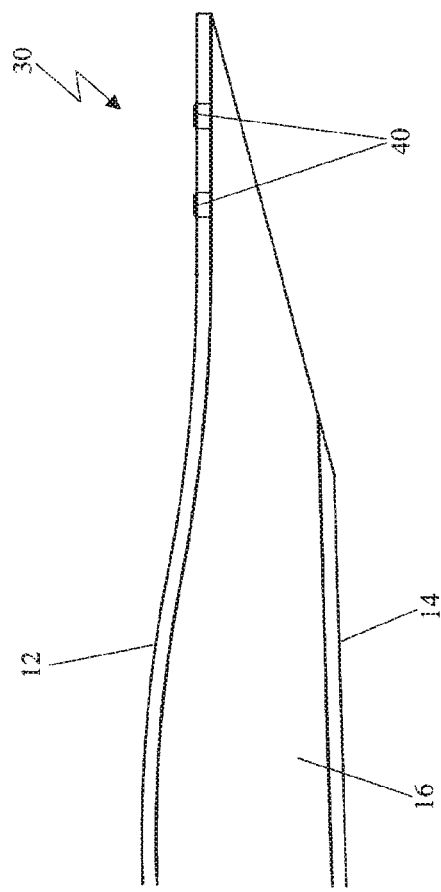
Figure 6:
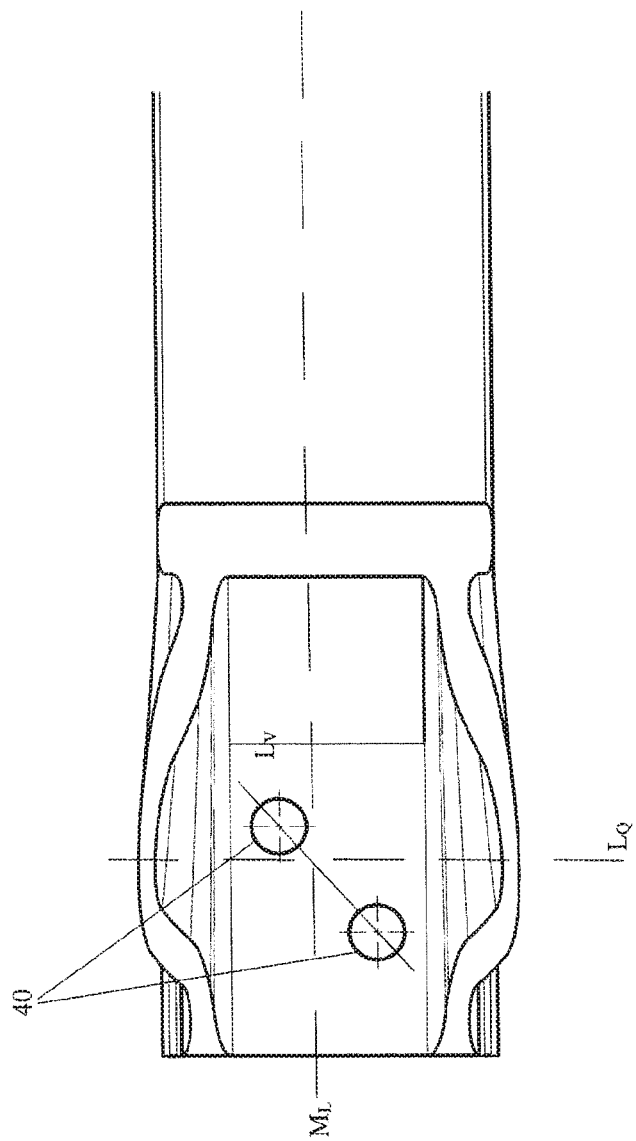

Different designs of the fastening ends 20; 30 are shown in FIGS. 4 and 5. It may be preferred to use only one construction type for both fastening ends 20; 30. In the same way, it may be preferred to provide the fastening ends 20; 30 in different construction types.

A first construction type of the fastening ends 20; 30 is described using the example of fastening end 20 in FIG. 4. At the fastening end 20, the base layer 12 and the top layer 14 were pressed together, i.e. they were compressed. As a result, the base layer 12 and the top layer 14 may abut against each other, and thereby reinforce the fastening end 20.

By compressing the hollow profile in the portion of the fastening end 20, the lateral faces 16 may be deformed laterally outwardly, so that outer folds 22 result. These folds 22, which are arranged opposite to each other, may extend the fastening face 24 of the fastening end 20 provided by the base layer 12 or the top layer 14.

A plurality of welding auxiliary joining parts 40 may be provided for fastening the fastening end 20 to a frame construction. The welding auxiliary joining parts 40 may consist of a weldable material in order to be welded to the frame construction or to a vehicle construction. Similar to a solid punch rivet or a welding stud, as described in DE 10 2012 010 870, DE 10 2012 018 866 or DE 10 2017 115 229, the plurality of welding auxiliary joining parts 40 is set into the fastening end 20 through the base layer 12 and the top layer 14. Accordingly, a head of the welding auxiliary joining part 40 supports itself on the base layer 12 or the top layer 14, respectively, and a shaft of the welding auxiliary joining part 40 projects from the opposite top layer 14 or the base layer 12. Accordingly, the projecting shaft portion is available to be welded to a frame construction or a vehicle construction. A resistance welding method may be used for this purpose.

As alternative connection means, punch rivets, nails or setting bolts, flow-forming screws or screw-nut combinations may be used at the fastening points of the fastening ends instead of the welding auxiliary joining parts. It is understood that screw-nut combinations can only be realized in combination with a hole previously provided at the fastening point. Compared to this, punch rivets, nails, bolts and flow-forming screws may be joined directly at the fastening points in a connecting manner. Additionally, clinching may also be preferred as a connection method without auxiliary joining part. In the following, the fastening of the impact protection reinforcement with welding auxiliary joining parts will be described. The fastening with welding auxiliary joining parts serves as an example for fastening with other above-mentioned connection means and can be applied analogously to these.

According to another construction of the fastening end 30, the latter is formed wedge-shaped in a side view (see FIG. 5). The wedge shape may be created by removing a part of the end of the top layer 14 in the direction of the transversal center line $M_Q$. As a result, the base layer 12 is freely accessible in this area in order to set the welding auxiliary joining parts 40 in it and subsequently weld them. From FIG. 5 it can be seen that the head of the welding auxiliary joining part 40 supports itself on the base layer 12 facing the top layer 14. On the side of the base layer 12 facing away from the top layer 14, the shaft of the welding auxiliary joining part 40 protrudes so that it can be welded by means of resistance welding.

The top layer 14 may be cut out or shortened in the area of the fastening end 30 to such an extent that the welding auxiliary joining parts 40 are easily accessible for the welding electrodes for resistance welding.

It likewise may be preferred to cut out the base layer 12 and to set the welding auxiliary joining parts 40 into the top layer 14.

According to further embodiments, the fastening ends 20; 30 are welded to a frame construction by means of resistance welding by a plurality of welding auxiliary joining parts 40. For this purpose, the welding auxiliary joining parts 40 are first set into the fastening ends 20; 30 as described above.

According to a further embodiment, the welding auxiliary joining parts 40 are set into the fastening ends 20; 30 in the context of the manufacturing method of the impact protection reinforcement 1.

According to a further embodiment, in the context of the connection method of the impact protection reinforcement 1 with the frame construction, the welding auxiliary joining parts 40 are set into the fastening ends 20; 30 before welding the impact protection reinforcement 1 to the frame construction.

According to a first design, two welding auxiliary joining parts 40 are set into the fastening end 20; 30. The two welding auxiliary joining parts 40 are positioned at fastening points which are spaced apart from each other in the direction of the longitudinal center line $M_L$ and the transversal center line $M_Q$. Correspondingly, the only two welding auxiliary joining parts 40 are not positioned together on the longitudinal center line $M_L$ and a line $L_Q$ parallel to the transversal center line $M_Q$. The two fastening points or already set welding auxiliary joining parts 40 may be arranged on a connection line $L_v$, which is inclined at an angle different from 0° or from 90° to the longitudinal center line $M_L$ and the transversal center line $M_Q$.

It may also be preferred that the welding auxiliary joining parts 40 are spaced apart from each other along the connection line $L_v$ in a predefined range. This distance or range may be chosen in such a manner that a danger of an electrical shunt during resistance welding via an adjacent connection is reduced.

Figure 7:
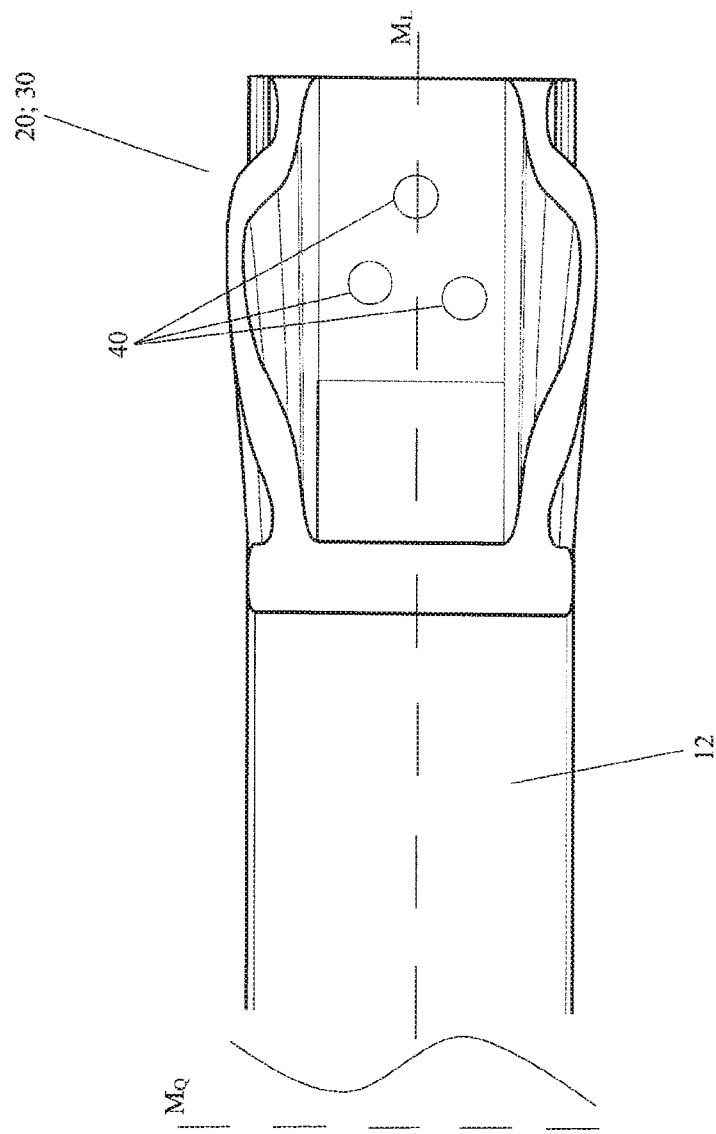

According to FIG. 7, it may also be preferred to fasten at least one fastening end 20; 30 by means of only three welding auxiliary joining parts 40. These are set in the flat fastening end 20; 30 in such a manner that at least two of the fastening points are spaced apart and arranged differently from the transversal center line $M_Q$ and all three of the fastening points are spaced apart and arranged differently from the longitudinal center line $M_L$. It becomes apparent from FIGS. 7 and 8 that the welding auxiliary joining parts 40 may be arranged at the same distance from the longitudinal center line $M_L$. However, as one welding auxiliary joining part 40 is arranged or positioned above and one welding auxiliary joining part 40 is arranged or positioned below the longitudinal center line $M_L$, or one welding auxiliary joining part 40 is arranged or positioned to the right and one welding auxiliary joining part 40 is arranged or positioned to the left of the longitudinal center line $M_L$, the fastening pattern results in which all three fastening points or welding auxiliary joining parts are spaced apart and positioned differently from the longitudinal center line $M_L$.

Figure 8:
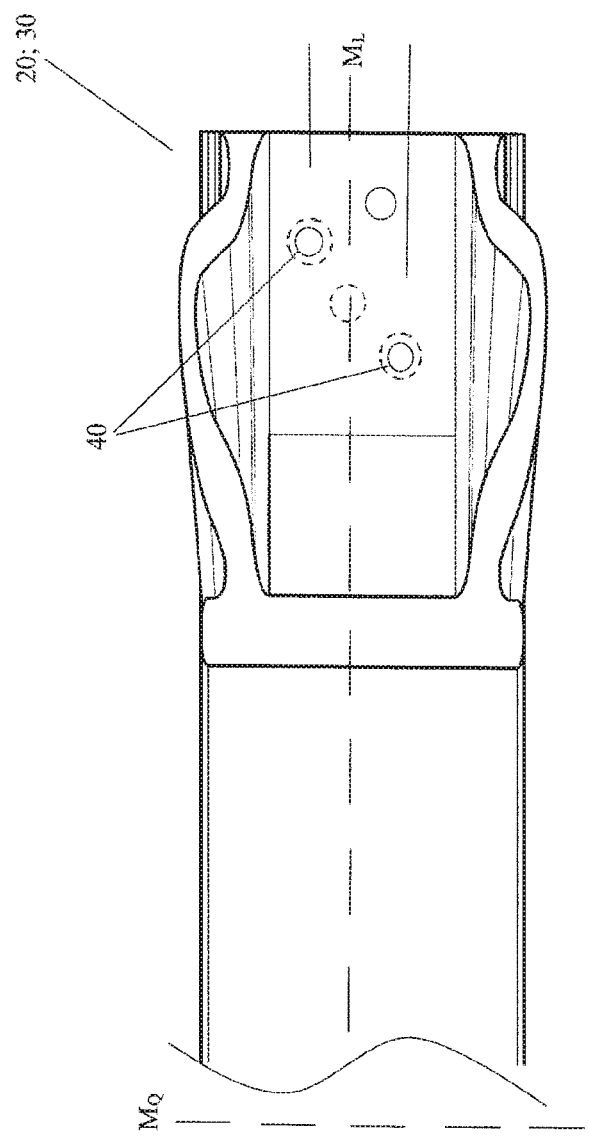

Accordingly, the welding auxiliary joining parts 40 or the preselected fastening points form the following shapes: an isosceles triangle (FIG. 7), an equal-sided triangle (not shown), an unequal-sided triangle (FIG. 8) or a line (see FIG. 8 with the welding auxiliary joining parts 40 drawn dashed).

According to another embodiment (see FIG. 4), at least one fastening end 20; 30 is fastened with only four welding auxiliary joining parts 40 at four fastening points. At least two of the welding auxiliary joining parts 40 are spaced apart and positioned differently from the transversal center line $M_Q$ and at least two of the welding auxiliary joining parts 40 are spaced apart and positioned differently from the longitudinal center line $M_L$. Under the above condition, the only four welding auxiliary joining parts 40 form one of the following shapes: a square, a rectangle, a parallelogram, a trapezoid, an irregular square or a triangle.

Furthermore, the present disclosure comprises the connection method already mentioned above for the impact protection reinforcement 1 with a vehicle construction or a frame construction. This connection method comprises the following steps: arranging the impact protection reinforcement 1 in the vehicle construction in step V 1. Subsequently, the impact protection reinforcement is connected by the welding auxiliary joining parts 40 being present in the fastening ends 20; 30 to the vehicle construction by means of resistance welding (step V 2).

In the context of this connection method, it may also be preferred as a preparation step to first set the plurality of welding auxiliary joining parts 40 into the fastening ends 20; 30 of the impact protection reinforcement 1.

Figure 9:
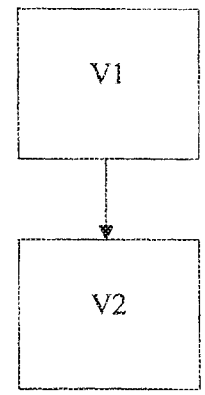

The connection method is illustrated by a flow chart in FIG. 9 according to a further embodiment.

In addition, the present disclosure provides the above mentioned manufacturing method for the impact protection reinforcement 1 of aluminum or an aluminum alloy. After the elongated profile element has been extruded or continuously cast as a hollow profile (step H 1), the two fastening ends 20; 30 are formed. These fastening ends 20; 30 may have the same shape or different shapes.

According to a first alternative, in step H 2 a compressing of at least one end of the profile element takes place so that the base layer 12 and the top layer 14 are arranged adjacent to each other and the lateral faces 16 have been widened laterally outwardly relative to the longitudinal center line $M_L$ of the impact protection reinforcement 1.

Alternatively, it may also be preferred that in step H 2 the base layer 12 or the top layer 14 is cut out in the area of the fastening end 20; 30, so that at least one fastening end 20; 30 is formed wedge-shaped in a side view in the direction of the transversal center line $M_Q$. Accordingly, the fastening points for the welding auxiliary joining parts 40 are arranged in the uncut top layer 14 or base layer 12.

Furthermore, it may be preferred that the preparatory setting of the welding auxiliary joining parts 40 in the fastening ends 20; 30 may be carried out as a partial step of the manufacturing method. Accordingly, a plurality of welding auxiliary joining parts 40 are set into each fastening end 20; 30 in order to prepare for a welding of the impact protection reinforcement 1 to a vehicle construction by means of resistance welding.

Figure 10:
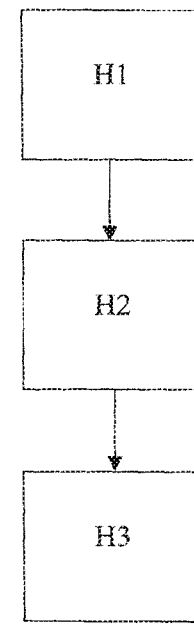

The individual steps of the above-described manufacturing method are illustrated by means of a flow chart in FIG. 10.

The invention claimed is:

1. An impact protection reinforcement of a vehicle construction, which is supportively fastenable in the vehicle construction against the action of external mechanical extraordinary load conditions and which comprises the following features:
   a. an elongated profile element with a longitudinal center line and a transversal center line arranged transversely to the longitudinal center line, which has in the longitudinal direction at each end side a fastening end and a central part therebetween,
   b. the central part consists of a circumferentially closed hollow profile with a base layer and a top layer arranged opposite to the base layer, which are connected to each other via lateral faces, and
   c. the fastening ends each have a flat shape with at least two fastening points which are spaced apart differently from the transversal center line and the longitudinal center line and are provided as connection points, in particular as welding connection points, to the vehicle construction.

2. The impact protection reinforcement according to claim 1, wherein the base layer and the top layer of the hollow profile of the central part have a greater thickness than the connecting lateral faces.

3. The impact protection reinforcement according to claim 1, wherein at least one fastening end consists of a compressed hollow profile, so that the base layer and the top layer are arranged adjacent to each other in a planar manner and the lateral faces are widened laterally outwardly relative to the longitudinal center line of the impact protection reinforcement.

4. The impact protection reinforcement according to claim 1, wherein at least one fastening end is formed wedge-shaped in a side view in the direction of the transversal center line and the base layer or the top layer is cut out so that the fastening points are arranged in the uncut top layer or base layer.

5. The impact protection reinforcement according to claim 1, which provides a) at at least one fastening end only two fastening points for one connection means each, which are spaced apart from each other in the transversal and longitudinal direction of the impact protection reinforcement or which provides b) at at least one fastening end only three fastening points for one connection means each, of which at least two are spaced apart and positioned differently from the transversal center line and all are spaced apart and positioned differently from the longitudinal center line or which provides c) at at least one fastening end only four fastening points for one connection means each, of which at least two are differently spaced apart from the transversal center line and at least two are differently spaced apart from the longitudinal center line of the impact protection reinforcement.

6. The impact protection reinforcement according to claim 5, wherein the fastening ends have at the fastening points one welding auxiliary joining part each joined therein, which is weldable to a vehicle construction made of steel, or wherein the fastening ends have at the fastening points one bore each via which the impact protection reinforcement is screwable to a vehicle construction.

7. The impact protection reinforcement according to claim 1, which is provided
a) as an extruded or continuously cast aluminum profile consisting of aluminum or an aluminum alloy or which is provided
b) as a roll-formed or deep-drawn metal part, preferably made of steel or a metal alloy, or as a metal cast part.

8. A vehicle construction with at least one impact protection reinforcement according to claim 1, which is connected to the vehicle construction by the fastening ends.

9. The vehicle construction according to claim 8, wherein
i) the impact protection reinforcement is provided a) as an extruded or continuously cast aluminum profile consisting of aluminum or an aluminum alloy or b) as a roll-formed or deep-drawn metal part, preferably made of steel or a metal alloy, or as a metal cast part, wherein
ii) the fastening ends have at the fastening points one welding auxiliary joining part each joined therein, which is weldable to a vehicle construction made of steel, and wherein
iii) the welding auxiliary joining parts placed in the fastening ends of the impact protection reinforcement are welded to the vehicle construction by means of a resistance welding method and provide a firm connection between the vehicle construction and the impact protection reinforcement.

10. The vehicle construction according to claim 8, wherein
i) the impact protection reinforcement is provided a) as an extruded or continuously cast aluminum profile consisting of aluminum or an aluminum alloy or b) as a roll-formed or deep-drawn metal part, preferably made of steel or a metal alloy, or as a metal cast part, wherein
ii) the fastening ends have at the fastening points one bore each via which the impact protection reinforcement is screwable to a vehicle construction, and wherein
iii) the fastening ends of the impact protection reinforcement are screwed to the vehicle construction via the plurality of bores provided therein and provide a firm connection between the vehicle construction and the impact protection reinforcement.

11. The vehicle construction according to claim 8, wherein
i) the impact protection reinforcement is provided a) as an extruded or continuously cast aluminum profile consisting of aluminum or an aluminum alloy or b) as a roll-formed or deep-drawn metal part, preferably made of steel or a metal alloy, or as a metal cast part, wherein
ii) the impact protection reinforcement provides a) at at least one fastening end only two fastening points for one connection means each, which are spaced apart from each other in the transversal and longitudinal direction of the impact protection reinforcement or b) at at least one fastening end only three fastening points for one connection means each, of which at least two are spaced apart and positioned differently from the transversal center line and all are spaced apart and positioned differently from the longitudinal center line or c) at at least one fastening end only four fastening points for one connection means each, of which at least two are differently spaced apart from the transversal center line and at least two are differently spaced apart from the longitudinal center line of the impact protection reinforcement, and wherein
iii) the fastening ends of the impact protection reinforcement are connected to the vehicle construction by the plurality of fastening points provided there each having a punch rivet, a bolt or nail, a flow-forming screw or a clinch connection and provide a firm connection between the vehicle construction and the impact protection reinforcement.

\* \* \* \* \*